(12) United States Patent
Burns et al.

(10) Patent No.: US 8,267,235 B2
(45) Date of Patent: Sep. 18, 2012

(54) TORQUE LIMITING CLUTCH ASSEMBLY

(75) Inventors: Timothy M. Burns, Elbridge, NY (US);
Sankar K. Mohan, Jamesville, NY
(US); Anupam Sharma, Brewerton, NY
(US)

(73) Assignee: MAGNA Powertrain USA, Inc., Troy, MI (US)

( * ) Notice: Subject to any disclaimer, the term of this patent is extended or adjusted under 35 U.S.C. 154(b) by 594 days.

(21) Appl. No.: 12/516,820

(22) PCT Filed: Nov. 7, 2007

(86) PCT No.: PCT/US2007/023382
§ 371 (c)(1),
(2), (4) Date: May 29, 2009

(87) PCT Pub. No.: WO2008/066666
PCT Pub. Date: Jun. 5, 2008

(65) Prior Publication Data
US 2010/0065394 A1 Mar. 18, 2010

Related U.S. Application Data

(60) Provisional application No. 60/872,067, filed on Nov. 30, 2006.

(51) Int. Cl.
*F16D 7/02* (2006.01)
*F16D 13/66* (2006.01)
(52) U.S. Cl. ............... 192/70.15; 192/107 M; 192/66.2; 464/42

(58) Field of Classification Search ............ 192/66.2, 192/70.15, 70.14, 66.22, 66.23; 464/42, 464/43, 44
See application file for complete search history.

(56) References Cited

U.S. PATENT DOCUMENTS

| | | | | | |
|---|---|---|---|---|---|
| 1,074,500 | A | * | 9/1913 | Evans | 192/70.2 |
| 1,660,497 | A | * | 2/1928 | Treiber | 192/70.15 |
| 2,738,864 | A | * | 3/1956 | Becker | 192/70.14 |
| 3,390,750 | A | * | 7/1968 | Albertson | 192/107 M |
| 3,654,692 | A | * | 4/1972 | Goetz | 29/558 |
| 5,086,898 | A | * | 2/1992 | Patton et al. | 192/70.12 |
| 5,221,401 | A | | 6/1993 | Genise | |
| 6,719,656 | B2 | * | 4/2004 | Bowen | 475/5 |
| 2002/0035003 | A1 | * | 3/2002 | Brown et al. | 475/317 |
| 2004/0062673 | A1 | | 4/2004 | Trasorras et al. | |

FOREIGN PATENT DOCUMENTS

WO    WO 2005073584 A1 *  8/2005

* cited by examiner

*Primary Examiner* — David D Le
*Assistant Examiner* — Lillian Nguyen
(74) *Attorney, Agent, or Firm* — Harness, Dickey & Pierce, P.L.C.

(57) ABSTRACT

A friction clutch comprising a plurality of first clutch plates and a plurality of second clutch plates, wherein at least a portion of each of the first clutch plates is frusto-conical in shape and wherein at last a portion of each of the second clutch plates has a shape that conforms to the at least the portion of the first clutch plates. A method for forming a friction clutch is also provided.

20 Claims, 5 Drawing Sheets

TORQUE LIMITING CLUTCH ASSEMBLY

CROSS-REFERENCE TO RELATED APPLICATIONS

This application is a National Stage of International Application No. PCT/US2007/023382, filed Nov. 7, 2007, which application claims the benefit of U.S. provisional application No. 60/872,067, filed Nov. 30, 2006. The entire disclosures of each of the above applications are incorporated herein by reference.

The present disclosure generally relates to vehicle drivelines and more particularly to a torque clutch limiting the transmission of drive torque in a vehicle driveline.

The drive torque provided through a vehicle driveline can vary widely based upon various vehicle and road conditions. In a conventional vehicle driveline, it is possible for the driveline to experience peaks in the transmission of drive torque that exceed two or three times the vehicle skid torque (also known as the vehicle slip torque). As will be appreciated, the use of components that are designed to handle two or three times the vehicle skid torque is disadvantageous in that these components (and therefore the vehicle) tend be more costly and heavy. Given that a vehicle's fuel economy is related to its weight, the weight of the vehicle driveline can be of particular significance.

SUMMARY

In one form the present disclosure provides a friction clutch comprising a plurality of first clutch plates and a plurality of second clutch plates, wherein at least a portion of each of the first clutch plates is frusto-conical in shape and wherein at least a portion of each of the second clutch plates has a shape that conforms to the at least the portion of the first clutch plates.

In another form, the present disclosure provides a method that includes: forming a plurality of first clutch plates, the first clutch plates being generally flat; forming a plurality of second clutch plates, the second clutch plates being generally flat; interleaving the first and second clutch plates; and resiliently deflecting the first and second clutch plates such that at least a portion of each of the first and second clutch plates is frusto-conical in shape.

In yet another form, the present disclosure provides a friction clutch that includes a first clutch portion, a plurality of first clutch plates that are non-rotatably but axially slidably mounted to the first clutch portion, a second clutch portion disposed about the first clutch portion, a plurality of second clutch plates non-rotatably but axially slidably mounted to the second clutch portion, a first apply plate having a first frusto-conical apply surface that is disposed on a first side of the first and second clutch plates, the first apply plate being axially coupled to the first clutch portion or the second clutch portion and a second apply plate having a second frusto-conical apply surface that is disposed on a second side of the first and second clutch plates. The second apply plate is axially coupled to the first clutch portion or the second clutch portion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
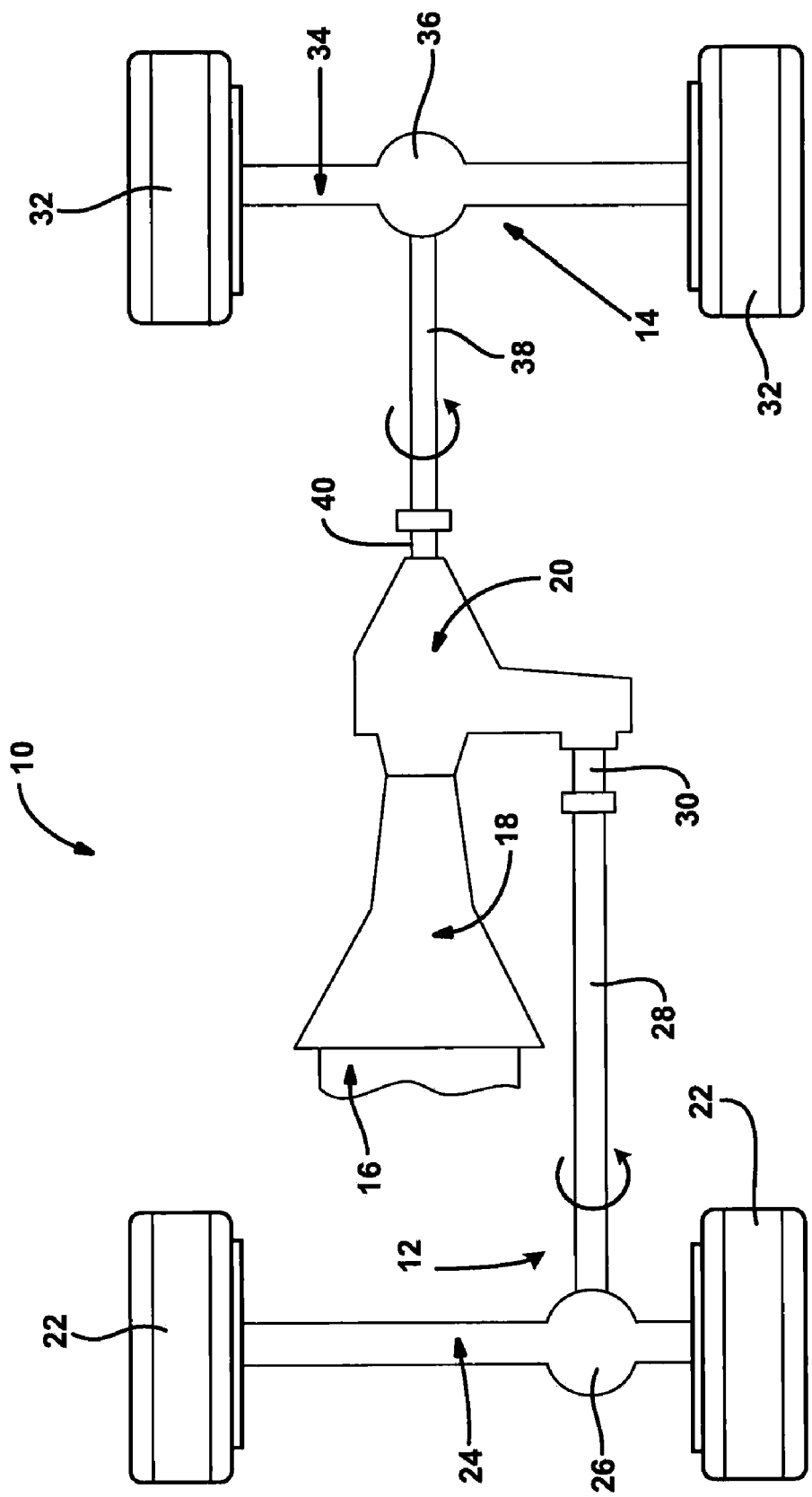
FIG. 1 is a schematic illustration of a vehicle having an exemplary power transfer assembly constructed in accordance with the teachings of the present disclosure.

Referring now to FIG. 1 of the drawings, an exemplary vehicle 10 is schematically shown to include a front driveline 12 and a rear driveline 14 that are drivable from a power train. The power train can include an engine 16 and transmission 18, which may be of either the manual or automatic shifting-type. In the particular example illustrated, the vehicle 10 further includes a transfer case 20 for transmitting drive torque from the transmission 18 to the front and rear drivelines 12 and 14. The front driveline 12 includes a pair of front wheels 22 that are connected to opposite ends of a front axle assembly 24. The front axle assembly 24 can include a front differential 26 that can be coupled one end of a front drive shaft 28. The end of the front drive shaft 28 opposite the front differential 26 can be coupled to a front output shaft 30 of the transfer case 20. Similarly, the rear driveline 14 can include a pair of rear wheels 32 that can be connected to the opposite ends of a rear axle assembly 34. The rear axle assembly 34 can have a rear differential 36 that can be coupled to an end of a rear drive shaft 38. The end of the rear drive shaft 38 opposite the rear differential 36 can be coupled to a rear output shaft 40 of the transfer case 20.

In the particular example provided, the transfer case 20 can be generally similar to that which is described in U.S. Pat. No. 6,709,357, the disclosure of which is hereby incorporated by reference as if fully set forth in detail herein. Those of ordinary skill in the art will appreciate, however, that the transfer case 20 could be generally similar to other types of transfer cases, such as those that are described in U.S. Pat. Nos. 6,712,729, 6,719,656, 6,824,487, and 6,846,262, the disclosures of which are hereby incorporated by reference as if fully set forth in detail herein.

Figure 2:
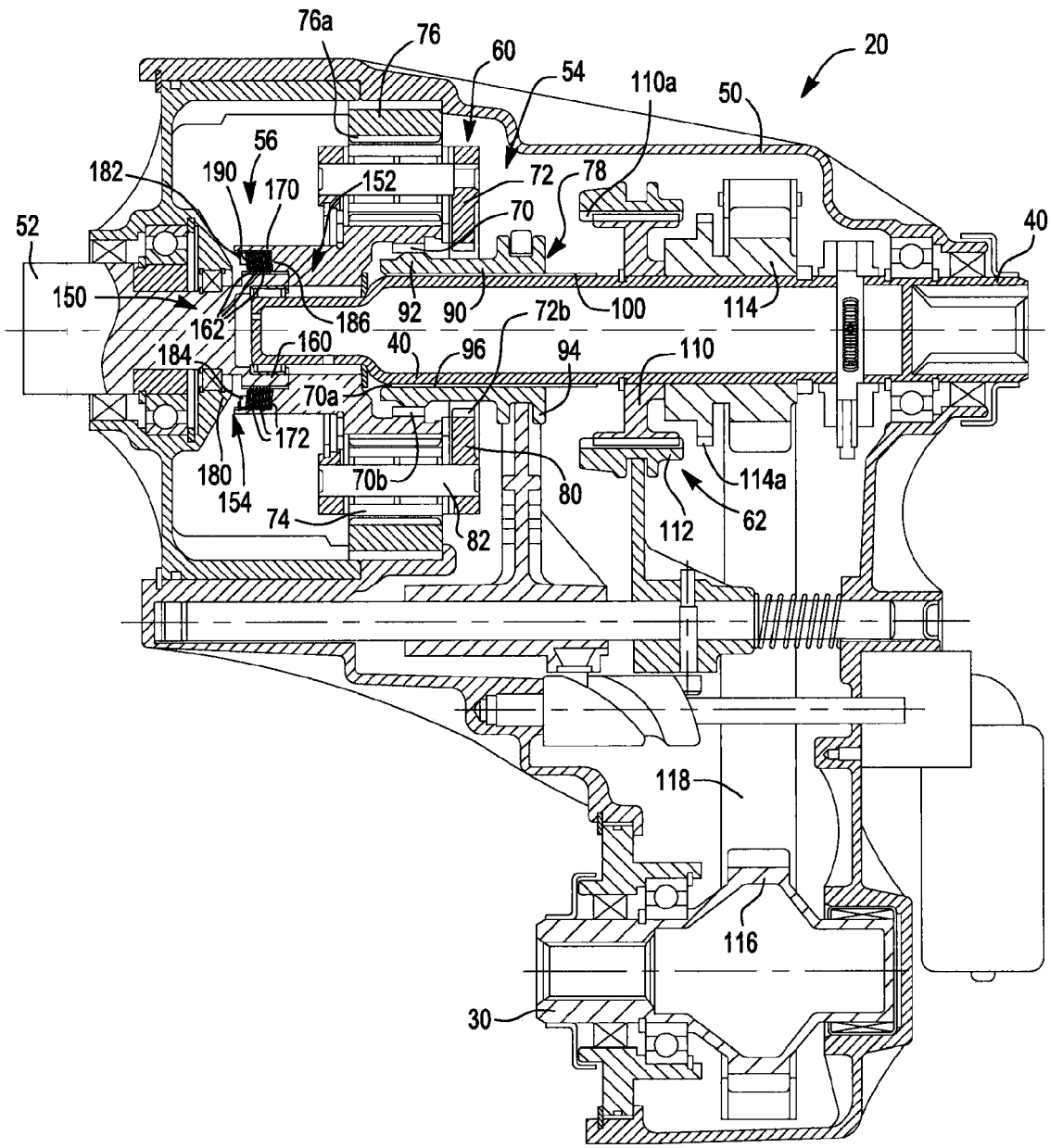
FIG. 2 is a sectional view of a portion of the vehicle of FIG. 1 illustrating the power transfer assembly in greater detail.
Figure 2A:
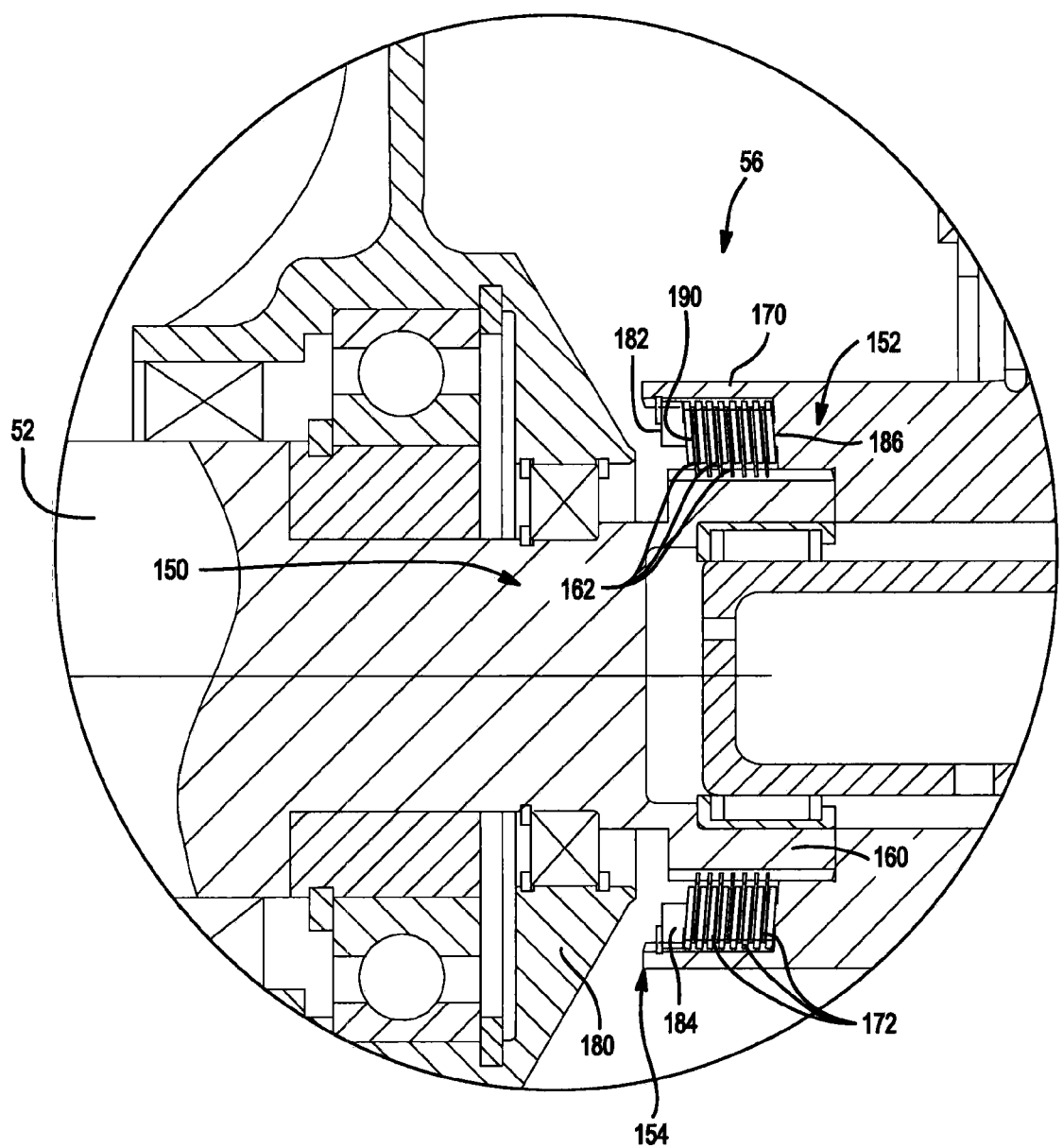
FIG. 2A is an enlarged portion of FIG. 2 showing an input clutch of the power transfer assembly in more detail.

With additional reference to FIG. 2, the transfer case 20 can include a housing 50, an input shaft 52, a power distributing system 54 and an input clutch 56. The input shaft 52 is supported for rotation by the housing 50 and is coupled to an output member (not shown) of the transmission 18 to receive drive torque therefrom. The power distributing system 54 is employed to distribute drive torque received from the input shaft 52 to the front and rear output shafts 30 and 40 in a desired manner. Typically, the manner in which drive torque is distributed between the front and rear output shafts 30 and 40 is dependent upon the configuration of the particular power distributing system that is employed, and the mode in which the transfer case 20 is operated if the transfer case 20 can be operated in more than one mode. In its simplest form, the power distributing system 54 could be configured to split torque in a predetermined manner between the front and rear drivelines 12 and 14 on a full-time basis with no inter-driveline torque differentiation. More sophisticated power distributing systems can permit the drive torque to be selectively applied to one of the drivelines (e.g., the front driveline 12) and can include clutch packs and/or differentials for controlling the distribution of drive torque between the front and rear drivelines 12 and 14. In the particular example provided, the power distributing system 54 includes a two-speed gear train 60, which permits the transfer case 20 to be operated in a high range mode and a low range mode, and a mode clutch 62 that permits the transfer case to be operated in a rear-wheel drive mode and a four-wheel drive mode.

With specific reference to FIG. 2, the two-speed gear train 60 can include a sun gear 70, a planet carrier 72, a plurality of planet gears 74, a ring gear 76 and a range clutch 78. The sun gear 70 can include an outer set of teeth 70a, an inner set of teeth 70b. The planet carrier 72 can include a body 80 and a plurality of pins 82 that can be fixedly (non-rotatably) coupled to the body 80. The body 80 can have an annular shape with a plurality of gear teeth 72b formed at its radially inner edge. The pins 82 can journally support the planet gears 74 for rotation thereon. The planet gears 74 can be meshingly engaged with the outer set of teeth 70a of the sun gear 70 and the teeth 76a of the ring gear 76. The ring gear 76 can be fixedly coupled to the housing 50.

The range clutch 78 can have a tubular body 90 that can define a set of range teeth 92, a yoke 94 and an internally-splined aperture 96. The rear output shaft 40 can include a splined portion 100 that can be non-rotatably but axially slidably received in the internally-splined aperture 96 to thereby non-rotatably couple the rear output shaft 40 and the range clutch 78. The set of range teeth 92 are sized to meshingly engage the inner set of teeth 70b of the sun gear 70 and the teeth 72b that are formed on the body 80 of the planet carrier 72. The range clutch 78 is axially movable on the rear output shaft 40 between a first position, in which the set of range teeth 92 are meshingly engaged to the inner set of teeth 70b of the sun gear 70, and a second position in which the set of range teeth 92 are meshingly engaged to the teeth 72b on the body 80 of the planet carrier 72.

The mode clutch 62 can include a hub member 110, a mode sleeve 112, a drive sprocket 114, a driven sprocket 116 and a chain carrier 118. The hub member 110 can be splined to the rear output shaft 40 to inhibit relative rotation therebetween. The mode sleeve 112 can include a plurality of internal spline teeth 110a that non-rotatably but axially slidably couple the mode sleeve 112 to the hub member 110. The drive sprocket 114 can be rotatably disposed on the output shaft 40 and can include external spline teeth 114a. The driven sprocket 116 can be non-rotatably coupled to the front output shaft 30. The chain carrier 118 can engage the drive sprocket 114 and the driven sprocket 116 to facilitate the transmission of drive torque there between. The mode sleeve 112 is movable between a first position, in which the internal spline teeth 110a are disengaged from the external spline teeth 114a of the drive sprocket 114, and a second position in which the internal spline teeth 110a are engaged to the external spline teeth 114a of the drive sprocket 114. In the former mode of operation, rotary power is not transmitted from the rear output shaft 40 to the drive sprocket 114 and as such, the transfer case 20 is operated in a two-wheel drive mode. In the latter mode of operation, rotary power is transmitted from the rear output shaft 40 to the drive sprocket 114 (and as such, to the driven sprocket 116) so that the transfer case 20 is operated in a four-wheel drive mode.

The input clutch 56 can be employed to selectively decouple the sun gear 70 from the input shaft 52. In the particular example provided, the input clutch 56 includes a first clutch portion 150, a second clutch portion 152 and preloading means 154 for preloading the input clutch 56. The first clutch portion 150 can include a first body 160, which is coupled for rotation with the input shaft 52 and supported for rotation by a housing 180, and a plurality of first clutch plates 162 that are non-rotatably but axially slidably coupled to the first body 160 (e.g., via teeth formed on the first body 160). The second clutch portion 152 can similarly include a second body 170, which can be non-rotatably but axially slidably coupled to the sun gear 70, and a plurality of second clutch plates 172 that are non-rotatably but axially slidably coupled to the second body 170 (e.g., via teeth formed on the second body 170).

Figure 3:
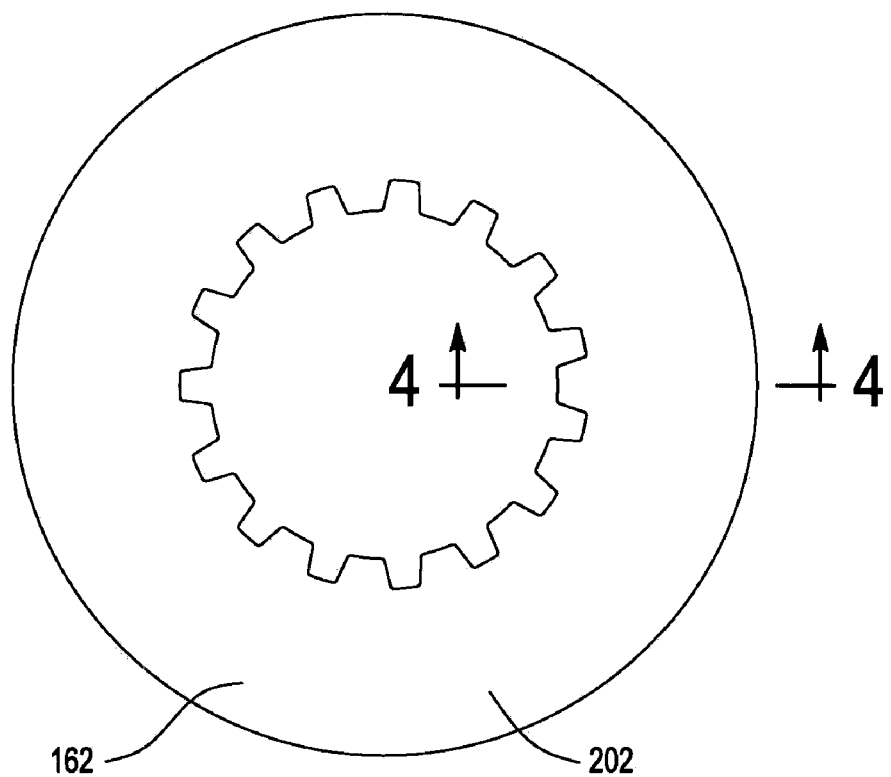
FIG. 3 is a side elevation view of a portion of the power transfer assembly illustrating a first clutch plate in greater detail.
Figure 4:
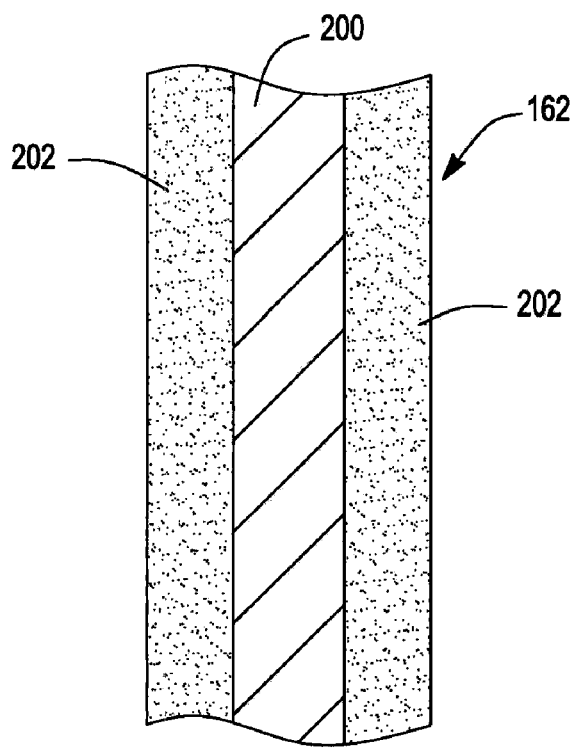
FIG. 4 is a sectional view taken along the line 4-4 of FIG. 3.

The first and second clutch plates 162 and 172 can be formed of any suitable material, such as a material that is at least partially formed of a non-organic friction material, such as carbon materials, sintered materials and combinations thereof. In the particular example provided, the first and second clutch plates 162 and 172 include a core, which can be formed of a first material, such as steel, and at least one outer surface that can be formed at least partially formed of a non-organic friction material. The construction of the clutch plates 162 is illustrated in FIGS. 3 and 4 in which the clutch plate 162 is illustrated to include a core 200 and friction layers 202 that are disposed on opposite sides of the core 200. Those of skill in the art will appreciate that the clutch plate 172 can be formed in a similar manner.

The preloading means 154 can include a snap ring 182, a first apply member or spacer 184 and a backing surface 186 that can be formed on a second apply member, such as the second body 170. In the particular example provided, the spacer 184 can include an engagement surface 190 that can be frusto-conical in shape and complementary to the backing surface 186. The first and second clutch plates 162 and 172 can be interleaved with one another and non-rotatably but axially slidably installed on the first and second bodies 160 and 170, respectively. The spacer 184 can include a plurality of teeth that can meshingly engage the teeth that are formed on the second body 170 to permit the spacer 184 to non-rotatably but axially slidingly engage the second body 170. The spacer 184 can be engaged to the first and second clutch plates 162 and 172 to cause the first and second clutch plates 162 and 172 to deflect in a manner that corresponds to the shaping of the engagement surface 190 and the backing surface 186. In the particular example provided, the first and second clutch plates 162 and 172 thus have a frusto-conical shape. Due to a resilient characteristic of the first and second clutch plates 162 and 172, the clutch plates 162 and 172 act as springs (e.g., Belleville spring washers) and apply a force between the spacer 184 and the backing surface 186 that inhibits relative rotation between the first and second bodies 160 and 170 to permit a predetermined amount of torque to be transmitted through the input clutch 56. The snap ring 182 can be employed to inhibit axial movement of the spacer 184 relative to the second body 170.

The predetermined amount of drive torque can correspond to a predetermined threshold torque (i.e., the input clutch 56 will slip when the torque at the vehicle wheels 22 and 32 (FIG. 1) exceeds the predetermined threshold torque). The threshold torque can be greater than or equal to the vehicle skid torque but less than a predetermined peak torque.

Figure 5:
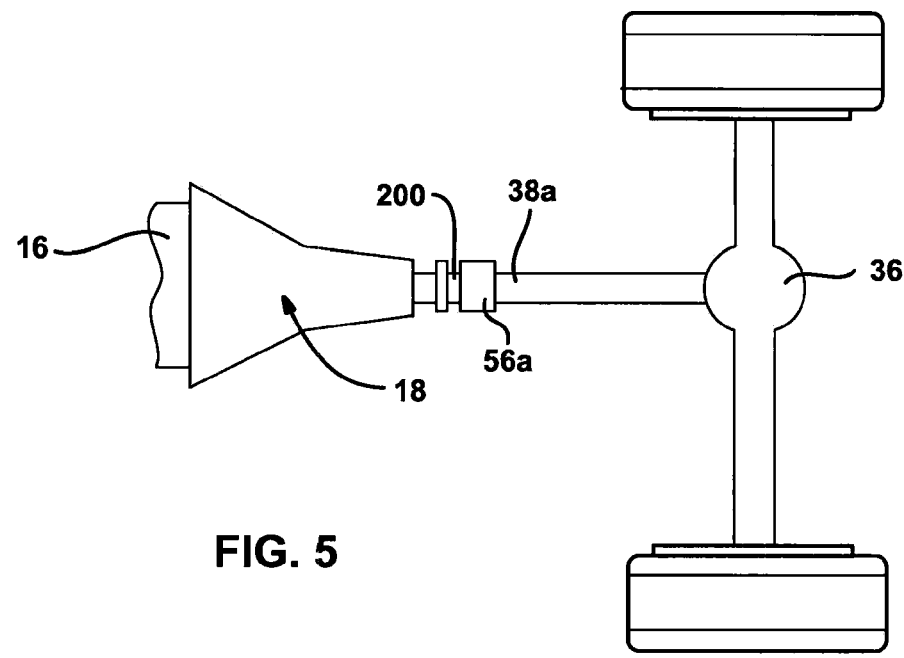
FIGS. 5 and 6 are schematic illustrations similar to that of FIG. 1 but illustrating vehicles having other types of power transfer assemblies constructed in accordance with the teachings of the present disclosure.
Figure 6:
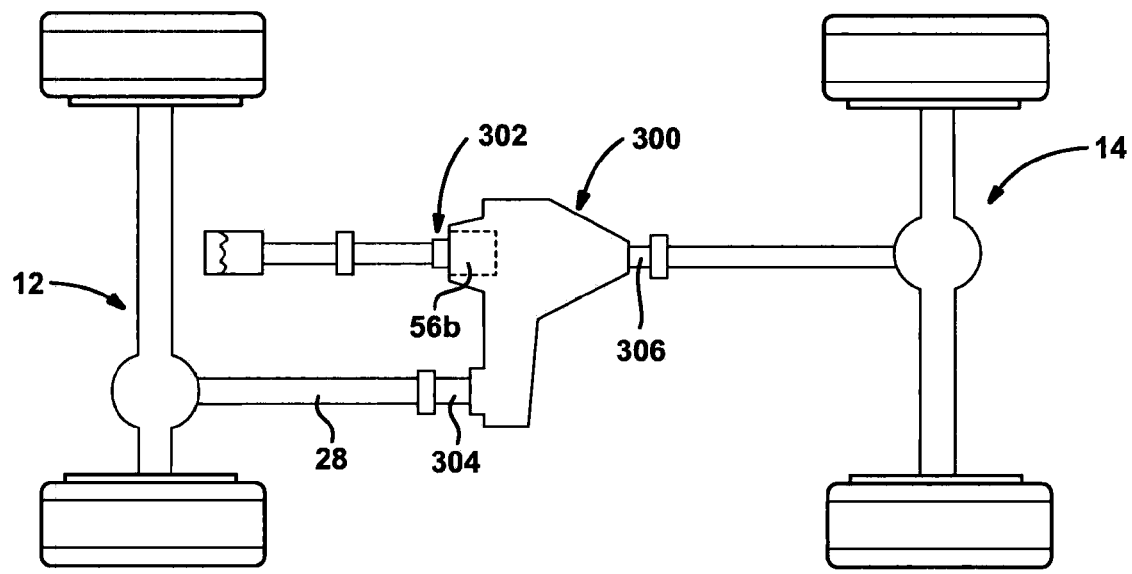

While the vehicle 10 (FIG. 1) has been illustrated as including a transfer case 20 having an input clutch 56, those skilled in the art will appreciate that the invention, in its broader aspects, may be constructed somewhat differently. For example, it will be appreciated that the input clutch could be associated with any power transfer assembly for a vehicle driveline, including propshafts, viscous couplings and differentials. In the example of FIG. 5, the input clutch 56a is coupled to an input portion 200 of the propshaft 38a. As such, the torque that is transmitted to through the propshaft 38a and input to the rear axle assembly 38 does not exceed the predetermined threshold torque. In the example of FIG. 6, rotary power is received by a center differential 300 from the transmission 18. The input clutch 56b is coupled to the input member 302 of the center differential 300 and limits the torque that is transmitted to the front and rear output shafts 304 and 306 of the center differential 300, as well as to the front and rear drivelines 12 and 14. In view of the above disclosure, it will be appreciated that the input clutch (56, 56a, 56b) can be employed to limit the torque that is transmitted to components of the driveline or drivelines downstream from input clutch and as such, the input clutch can facilitate not only a reduction in the scale or strength of portions of a given power transfer assembly, but also of various components any other power transfer assembly or assemblies that receive rotary power from the power transfer assembly.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A friction clutch comprising a plurality of first clutch plates and a plurality of second clutch plates, wherein at least a portion of each of the first clutch plates includes a substantially planar shape when in an unloaded state and is frusto-conical in shape when in a loaded state and wherein at least a portion of each of the second clutch plates has a shape that conforms to the at least the portion of the first clutch plates.

2. The friction clutch of claim 1, wherein the at least the portion of the first clutch plates is at least partially formed of a non-organic friction material.

3. The friction clutch of claim 2, wherein the non-organic friction material is selected from a group consisting of carbon materials, sintered materials and combinations thereof.

4. The friction clutch of claim 2, wherein the non-organic friction material is coupled to a core that is formed of a different material.

5. The friction clutch of claim 4, wherein the different material is steel.

6. The friction clutch of claim 1, further comprising a first hub and a second hub, the first clutch plates being rotary fixed coupled but axially slidably engaged to the first hub, the second clutch plates being rotary fixed coupled to but axially slidably engaged to the second hub.

7. The friction clutch of claim 6, wherein a first apply member is coupled to the second hub, the first apply member having a first pressure surface that abuts a first one of the first and second clutch plates, at least a portion of the first pressure surface having a frusto-conical shape.

8. The friction clutch of claim 7, wherein a second apply member is coupled to one of the first and second hubs, the second apply member having a second pressure surface that abuts at least one of the first and second clutch plates, at least a portion of the second pressure surface having a frusto-conical shape.

9. The friction clutch of claim 8, wherein a gear or a sprocket is rotary fixed coupled to the second hub.

10. The friction clutch of claim 9, wherein the second hub includes a plurality of longitudinally extending splines that engage the second clutch plates and the second pressure plate.

11. A method comprising:
forming a plurality of first clutch plates, the first clutch plates being generally flat;
forming a plurality of second clutch plates, the second clutch plates being generally flat;
interleaving the first and second clutch plates; and
resiliently deflecting the first and second clutch plates such that at least a portion of each of the first and second clutch plates is frusto-conical in shape.

12. The method of claim 11, further comprising non-rotatably coupling the first clutch plates to a first clutch portion.

13. The method of claim 12, wherein the first clutch portion includes a first plate member having a frusto-conical shape.

14. The method of claim 13, wherein resiliently deflecting the first and second clutch plates includes compressing generally flat first and second clutch plates between the first plate member and a second apply member that has a frusto-conical shape.

15. The method of claim 14, wherein the second apply member is axially coupled to the first clutch portion.

16. The method of claim 15, wherein the second apply member is non-rotatably coupled to the first clutch portion.

17. The method of claim 16, further comprising non-rotatably coupling the second clutch plates to a second clutch portion.

18. A friction clutch comprising:
a first clutch portion;
a plurality of first clutch plates non-rotatably but axially slidably mounted to the first clutch portion;
a second clutch portion disposed about the first clutch portion;
a plurality of second clutch plates non-rotatably but axially slidably mounted to the second clutch portion;
a first apply member having a first frusto-conical apply surface that is disposed on a first side of the first and second clutch plates, the first apply member being axially coupled to the first clutch portion or the second clutch portion; and
a second apply member having a second frusto-conical apply surface that is disposed on a second side of the first and second clutch plates, the second apply member being axially coupled to the first clutch portion or the second clutch portion.

19. The friction clutch of claim 18, wherein the first and second apply members are axially coupled to the second clutch portion.

20. The friction clutch of claim 18, wherein the first and second clutch plates have a core portion and a friction material that is coupled to the core portion, the friction material being selected from a group consisting of non-organic carbon materials, sintered materials and combinations thereof.

* * * * *